US009922464B2

(12) United States Patent
Haseltine et al.

(10) Patent No.: US 9,922,464 B2
(45) Date of Patent: Mar. 20, 2018

(54) OCCLUDED VIRTUAL IMAGE DISPLAY

(71) Applicant: Disney Enterprises, Inc., Burbank, CA (US)

(72) Inventors: Eric C. Haseltine, Silver Spring, MD (US); Quinn Yorklun Jen Smithwick, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/150,916

(22) Filed: May 10, 2016

(65) Prior Publication Data

US 2017/0330376 A1    Nov. 16, 2017

(51) Int. Cl.
*G09G 5/00*   (2006.01)
*G06T 19/00*  (2011.01)
*G02B 27/01*  (2006.01)
*G06F 3/01*   (2006.01)

(52) U.S. Cl.
CPC .......... *G06T 19/006* (2013.01); *G02B 27/017* (2013.01); *G02B 2027/0178* (2013.01); *G06F 3/011* (2013.01); *G06F 3/012* (2013.01); *G06T 19/00* (2013.01)

(58) Field of Classification Search
CPC ....... G06T 19/006; G06T 19/00; G06F 3/011; G06F 3/012; G02B 27/017
See application file for complete search history.

(56) References Cited

U.S. PATENT DOCUMENTS

| 5,831,712 | A | * | 11/1998 | Tabata | G02B 27/0172 351/158 |
|---|---|---|---|---|---|
| 5,913,591 | A | * | 6/1999 | Melville | G02B 27/01 345/9 |
| 7,379,247 | B2 | * | 5/2008 | Goto | G02B 7/10 359/627 |
| 7,639,208 | B1 | * | 12/2009 | Ha | G02B 27/0172 345/204 |
| 9,164,281 | B2 | * | 10/2015 | Hing | G02B 27/01 |

(Continued)

OTHER PUBLICATIONS

Kiyokawa et al. "An Occlusion-Capable Optical See-through Head Mount Display for Supporting Co-located Collaboration" 2003 IEEE, downloaded from <http://bdcampbell.net/articles/ISMARPaper.pdf>, pp. 1-9.

(Continued)

*Primary Examiner* — Abderrahim Merouan
(74) *Attorney, Agent, or Firm* — Patterson + Sheridan, LLP (57) ABSTRACT

Embodiments described herein include an augmented reality (AR) optical system, and associated method and computer program product, defining a field of view relative to an optical reference point. The optical system comprises an imagery display configured to display images using a received first display signal, and a beam-splitter disposed within the field of view and configured to cause the displayed images to appear in a first focal plane within the field of view. The optical system further comprises an occluding display disposed within the field of view and configured to display, based on the first display signal, occluding images in a second focal plane nearer to the beam-splitter than the first focal plane, thereby reducing environmental light at the optical reference point for at least a portion of the displayed images.

20 Claims, 5 Drawing Sheets

(56) References Cited

U.S. PATENT DOCUMENTS

| | | | |
|---|---|---|---|
| 2011/0075257 A1* | 3/2011 | Hua | G02B 27/017 |
| | | | 359/464 |
| 2012/0313839 A1* | 12/2012 | Smithwick | G02B 27/2214 |
| | | | 345/6 |
| 2013/0208014 A1 | 8/2013 | Fleck et al. | |
| 2014/0112651 A1* | 4/2014 | Sato | G02B 15/14 |
| | | | 396/379 |
| 2014/0177023 A1* | 6/2014 | Gao | H04N 5/2258 |
| | | | 359/238 |
| 2016/0247319 A1* | 8/2016 | Nowatzyk | G02B 27/0172 |

OTHER PUBLICATIONS

Kiyokawa et al. "An optical see-through display for mutual occlusion with a real-time stereovision system" 2001 Elsevier Science Ltd, downloaded from <http://www-prima.inrialpes.fr/perso/Tran/Documents/Articles/J.Crowley/25_5.pdf>, pp. 1-15.

Kiyokaw et al. "ELMO: An Enhanced Optical See-Through Display Using an LCD Panel for Mutual Occulsion", downloaded from <http://lab.ime.cmc.osaka-u.ac.jp/~kiyo/cr/kiyokawa-2001-03-ISMR2001/kiyokawa-2001-03-ISMR2001.pdf> on Apr. 4, 2016, pp. 1-2.

Choi et al. "Paraxial ray optics cloaking", 2014 Optical Society of America, vol. 22, Issue 24, downloaded from <https://www.osapublishing.org/oe/fulltext.cfm?uri=oe-22-24-29465 &id=304785>, 14 pages.

Cakmakci et al. Design of a compact optical see-through head-worn display with mutual occlusion capability, downloaded from <http://citeseerx.ist.psu.edu/viewdoc/download?doi=10.1.1.63.8378 &rep=rep1&type=pdf>, 6 pages.

Disney Enterprises, Inc., U.S. Appl. No. 15/099,412, filed Apr. 14, 2016, 43 pages.

* cited by examiner

OCCLUDED VIRTUAL IMAGE DISPLAY

BACKGROUND

Field of the Disclosure

The present disclosure generally relates to home entertainment, and more specifically to techniques for providing an augmented reality (AR) display.

Description of the Related Art

Computer graphics technology has significantly progressed since the first video games were developed. Relatively inexpensive 3D graphics engines now provide nearly photo-realistic interactive game play on hand-held video game, home video game, and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of visual sensing device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

SUMMARY

One embodiment described herein is an augmented reality (AR) optical system defining a field of view relative to an optical reference point. The optical system comprises an imagery display configured to display images using a received first display signal, and a beam-splitter disposed within the field of view and configured to cause the displayed images to appear in a first focal plane within the field of view. The optical system further comprises an occluding display disposed within the field of view and configured to display, based on the first display signal, occluding images in a second focal plane nearer to the beam-splitter than the first focal plane, thereby reducing environmental light at the optical reference point for at least a portion of the displayed images.

Another embodiment described herein is a method for operating an augmented reality (AR) optical system for a viewer within an environment, the viewer having a field of view. The method comprises updating an imagery display using a first display signal, the imagery display configured to display images that are coupled by a beam-splitter into the field of view, the displayed images appearing in a first focal plane relative to the viewer. The method further comprises updating, in synchronization with updating the imagery display, an occluding display based on the first display signal. The occluding display is disposed within the field of view and configured to display occluding images in a second focal plane nearer to the viewer than the first focal plane, thereby reducing environmental light viewed by the viewer for at least a portion of the displayed images.

Another embodiment described herein is a computer program product for operating an augmented reality (AR) optical system defining a field of view relative to an optical reference point. The computer program product comprises a computer-readable device having computer-readable program code embodied therewith. The computer-readable program code is executable by one or more computer processors to update an imagery display using a first display signal, the imagery display configured to display images that are caused by a beam-splitter to appear in a first focal plane within the field of view. The computer-readable program code is further executable to update, in synchronization with updating the imagery display, an occluding display based on the first display signal. The occluding display disposed within the field of view and configured to display occluding images in a second focal plane nearer to the beam-splitter than the first focal plane, thereby reducing environmental light at the optical reference point for at least a portion of the displayed images.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In augmented reality (AR) displays, in which a virtual image is superimposed on real background objects using beam-splitters and other optical elements, the virtual images can experience significant bleed-through, meaning that the background objects can easily be seen through the virtual images. This effect counters the interactive nature of AR displays and degrades the illusion that the virtual images are present in the physical world. The bleed-through effect is especially pronounced for portions of the virtual images having very low luminance. For AR displays and other applications of hybrid virtual image/real image displays, it is therefore desirable to control the amount of light from background objects that reaches a viewer wherever virtual imagery is superimposed on the real world.

Generally, embodiments presented herein provide techniques related to an augmented reality (AR) optical system defining a field of view relative to an optical reference point. The optical system comprises an imagery display configured to display images using a received first display signal, and a beam-splitter disposed within the field of view and configured to cause the displayed images to appear in a first focal plane within the field of view. The optical system further includes an occluding display disposed within the field of view and configured to display, based on the first display signal, occluding images in a second focal plane nearer to the beam-splitter than the first focal plane. Displaying the occluding images operates to reduce environmental light at the optical reference point for at least a portion of the displayed images. The occluding images effectively create an optical traveling matte that is capable of tracking virtual imagery and that substantially controls the amount of light from background objects that is able to reach a viewer.

Figure 1:
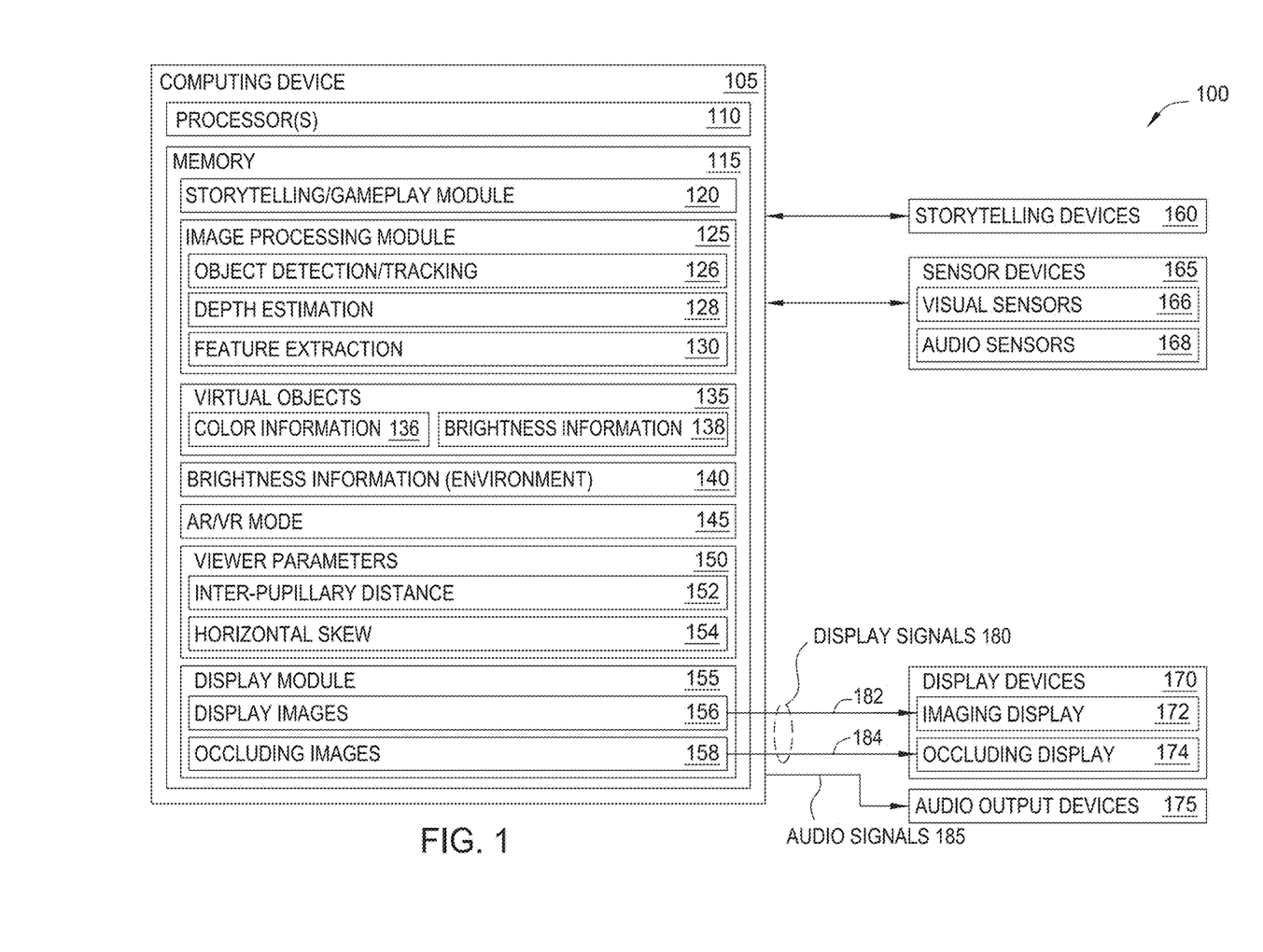
FIG. 1 is a schematic block diagram of an exemplary interactive environment, according to embodiments described herein.

FIG. 1 is a schematic block diagram of an exemplary interactive environment, according to embodiments described herein.

Within a system 100, a computing device 105 communicates with one or more sensor devices 165, one or more display devices 170, and one or more audio output devices 175. As will be discussed in greater detail below, the computing device 105 may provide an augmented reality (AR) and/or virtual reality (VR) display functionality for a user in the interactive environment. The computing device 105 may be embodied in any suitable form. In some embodiments, the computing device 105 is a body-worn computing device, e.g., integrated into an assembly worn on the head, arm, etc. of a user. In some embodiments, the computing device 105 comprises a mobile computing device, such as a smartphone, tablet, etc. In some embodiments, the mobile computing device is configured to physically and removably attach with a body-worn assembly.

Computing device 105 comprises, without limitation, one or more processors 110 and memory 115. The processors 110 generally retrieve and execute programming instructions stored in the memory 115. Processors 110 is included to be representative of a single central processing unit (CPU), multiple CPUs, a single CPU having multiple processing cores, graphics processing units (GPUs) having multiple execution paths, and the like. The memory 115 is generally included to be representative of a random access memory, but may further include non-volatile storage of any suitable type(s).

Memory 115 generally includes program code for performing various functions related to generating and maintaining the storytelling, gameplay, or other interactive environment. The program code is generally described as various functional "modules" within memory 115, although alternate implementations may have different functions and/or combinations of functions.

Within memory 115, a storytelling/gameplay module 120 is generally configured to control a storytelling, gameplay, or other interactive experience that is displayed to the user via display devices 170 and/or audio output devices 175. In some embodiments, the storytelling/gameplay module 120 is in the form of an application, such as a video game.

In some embodiments, the storytelling/gameplay module 120 is configured to generate a story using a selected predetermined story template (e.g., stored in memory 115), and based on a number of identified storytelling devices 160 that are available for participating in the storytelling experience. The storytelling devices 160 can be identified using a registration process performed by any suitable methods of communication. One non-limiting example includes a controller device (which may be a designated storytelling device 160 or the computing device 105) emitting a first signal such as an infrared (IR) signal, and other storytelling devices 160 transmitting a response signal such as a radio frequency (RF) signal in response to receiving the first signal.

Generally, a story may be generated by mapping predetermined actions that are associated with a selected story template to the available storytelling devices 160. For example, a particular story template can specify an initial mapping of storytelling device roles to specific actions, and the computing device 105 maps those actions onto available storytelling devices 160 that match the specified roles. The predetermined actions associated with the story are generally responsive to detecting particular stimulus events, and can include any suitable sensory outputs for generating the storytelling environment. The stimulus events may be based on the communication of coded infrared signals, sensor devices included within the storytelling devices (such as an inertial measurement unit), and so forth.

Some non-limiting examples of the predetermined actions include movement (e.g., displacement and/or vibration, articulation of elements) of the storytelling devices 160 responsive to a stimulus event, and generating audio outputs such as distinctive sound effects and/or speech. For example, a Hulk® action figure could be configured to perform an action after receiving a coded infrared signal corresponding to a "repulsor ray" hit from an Iron Man® action figure. The determined action performed by the storytelling device can be based on a history of interactions, such as how many hits the action figure has previously received. As an example, for the first repulsor ray hit, the Hulk® action figure could be configured to output a prerecorded roaring sound (e.g., using one or more speakers associated with the action figure). Upon receiving a second repulsor ray hit, the Hulk® action figure could be configured to manipulate its arms and head, in addition to outputting a roaring sound. After receiving a third repulsor ray hit, the Hulk® action figure could be configured to rock back and forth, and after receiving a fourth repulsor ray hit, the Hulk® action figure could be configured to fall over (i.e., to topple from an initial standing position) on the table.

The sensor devices 165 may be of any suitable type(s) and configured to sense information from the environment.

Some non-limiting examples of sensor devices 165 include visual sensors 166, audio sensors 168, pressure sensors, acceleration sensors, and temperature sensors. The visual sensors 166 generally include cameras configured to sense visible light and/or infrared light. The audio sensors 168 generally include microphones. In some embodiments, the sensor devices 165 may be included with (or within) the computing device 105. For example, where the computing device 105 is a smartphone or tablet device, the sensor devices 165 may include camera(s), inertial motion units (IMUs), etc. that included within the smartphone/tablet device. In some embodiments, the sensor devices 165 comprise sensors that are external to the computing device 105, e.g., a visual sensor 166 included with a head-worn device.

The memory 115 further includes an image processing module 125 configured to perform processing of image information captured by visual sensors 166 and/or display images 156. In some cases, the content of display images 156 is provided by the storytelling/gameplay module 120. The image processing module 125 may include any number of image processing functions, such as an object detection and tracking sub-module 126 configured to detect physical objects within the interactive environment (e.g., based on edge detection information, color information, and/or other suitable features) and to track the relative location of detected objects over time (e.g., as a user and/or the objects move throughout the interactive environment). The image processing module 125 further includes a depth estimation sub-module 128 configured to dynamically estimate a distance of the detected objects from the user. The correct estimation of detected objects can be important so that generated augmented reality (AR) objects are displayed at a correct depth (i.e., relative to the objects detected in the environment).

The display devices 170 include at least one imagery display 172 and at least one occluding display 174. The imagery display 172 and the occluding display 174 generally include visual displays of any suitable type. Some non-limiting examples of suitable visual displays include light emitting diode (LED), organic LED (OLED), liquid crystal display (LCD) including a super-twisted nematic (STN) LCD, plasma, electroluminescence (EL), electronic ink (e-ink), or other display technology. In one embodiment, a body-worn assembly includes a single imagery display 172 and a single occluding display 174. In another embodiment, the body-worn assembly includes one imagery display 172 and two occluding displays 174, each occluding display 174 corresponding to an eye of the viewer. In yet another embodiment, the body-worn assembly includes two imagery displays 172 and two occluding displays 174.

The imagery display 172 is configured to display images (or "virtual imagery") within a field of view of the optical system. In some embodiments, however, the imagery display 172 is disposed outside of the field of view and the displayed images are coupled into the field of view using a beam-splitter or other suitable optical arrangement. Based on the properties of the display and the beam-splitter, the display images appear in a first focal plane within the field of view.

The occluding display 174 is configured to display occluding images in the field of view to thereby reduce environmental light at the optical reference point for at least a portion of the displayed images. As discussed above, in cases where virtual imagery is superimposed on real objects (such as in AR displays), light from the background can bleed through the virtual images, degrading the virtual imagery and reducing the realistic quality of the AR experience. The bleed-through effect may be especially pronounced for portions of the virtual imagery having low luminance. However, increasing the luminance of the displayed images may be impractical or impossible (e.g., due to limitations of the imagery display 172 and/or the beam-splitter). In embodiments described herein, the occluding display 174 is substantially transmissive of the environmental light and disposed within the field of view of the viewer. The occluding display 174 may have any suitable implementation, such as a transmissive LCD, a transmissive electrowetting display, and a transmissive e-ink display. The occluding display 174 may be configured to display in any of monochrome, grayscale, and color. The occluding images 158 are displayed in a second focal plane that is at or nearer to the optical reference point (or the beam-splitter or the viewer) than the first focal plane at which the displayed images appear. Thus, the content displayed in the occluding images 158 operates to at least partly occlude environmental light corresponding to selected portions of the display images 156. In some embodiments, portions of the occluding images 158 are substantially transmissive, thereby allowing environment light to pass through substantially unmitigated.

Figure 2:
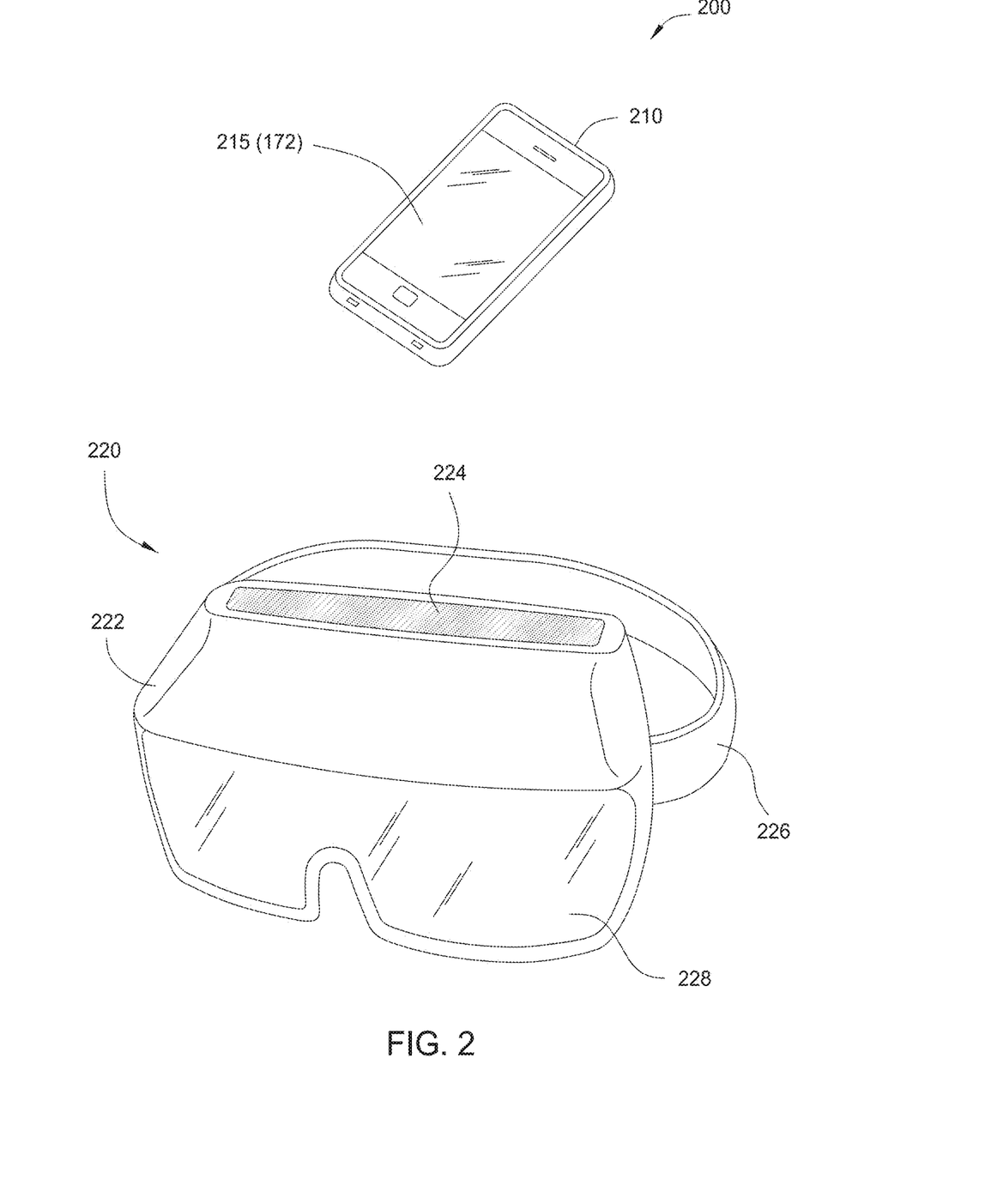
FIG. 2 is a diagram illustrating an augmented reality (AR) headset configured to interact with a mobile device, according to embodiments described herein.

In some embodiments, the imagery display 172 is included within the computing device 105 (e.g., a main display screen of the smartphone, tablet device, etc.). As discussed above, the computing device 105 may be configured to physically and removably attach with a body-worn device such as a headset. FIG. 2 provides one example implementation of an AR headset. The attachment of the computing device 105 with the body-worn device can provide the imagery display 172 with a desired orientation relative to the beam-splitter and to the viewer for producing the virtual imagery. In other embodiments, the imagery display 172 is separate from the computing device 105, e.g., a separate display integrated into the body-worn device.

In another example, the display devices 170 may be integrated into other devices that are carried or handled by the viewer, or having any other suitable viewer interaction during the storytelling or gameplay experience. For example, while participating in an example gameplay experience, the viewer can carry a toy blaster weapon that includes an optical sight for aiming, and the display devices 150 may be integrated in the optical sight.

Content displayed on display devices 170 is controlled based on display signals 180 produced by a display module 155. The display signals 180 comprise a first display signal 182 provided to the imagery display 172, and a second display signal 184 provided to the occluding display 174. The second display signal 184 is configured to operate the occluding display 174 in synchronization with the imagery display 172, such that a singular virtual imagery is provided to the viewer. In some embodiments, the second display signal 184 is substantially the same as the first display signal 182. In other embodiments, the second display signal 184 is generated by the display module 155 based on the first display signal 182.

Memory 115 further includes one or more virtual objects 135 that are included within display images 156. The display images 156 are generally used to produce the first display signal 182 for updating the imagery display 172. The object information for the one or more virtual objects 135 may be included within the first display signal 182 as such, or may be determined though subsequent processing of the first display signal 182 by the computing device 105, e.g., using the object detection and tracking sub-module 126 of image processing module 125.

The display module 155 uses the object information to determine which of the one or more virtual objects 135 to display on the occluding display 174, to determine occlusion levels for the one or more virtual objects 135, and so forth. In some cases, a single virtual object 135 is depicted on the occluding display 174. In other cases, multiple virtual objects 135 are depicted on the occluding display 174, which may have the same or different levels of occlusion. To determine which virtual objects 135 to occlude and/or levels of occlusion, the image processing module 125 further includes a feature extraction sub-module 130 that is configured to determine one or more predetermined properties of the display images 156 and/or image information acquired by the visual sensors 166. As shown, feature extraction sub-module 130 is configured to determine color information 136 and brightness information 138 of virtual objects 135. The feature extraction sub-module 130 may be further configured to determine environmental brightness information 140 using image information acquired by the visual sensors 166.

Generally, display module 155 uses color information 136, brightness information 138, and/or environmental brightness information 140 to produce occluding images 158 having desired characteristics. For example, for a particular virtual object 135 appearing in a display image 156, the display module 155 may produce an occluding image 158 corresponding to the virtual object 135 and overlapping the virtual object 135 in the viewer's field of view. The combination of the display image 156 with the occluding image 158 provides enhanced color accuracy and contrast for the viewer.

As discussed above, certain colors (e.g., black) of the virtual object 135, low brightness levels of the virtual object 135, and/or high environmental brightness levels may contribute to the background bleed-through and/or washing out effects for the virtual object 135 displayed by the imagery display 172. In various embodiments, the display module 155 controls the properties of the occluding images 158 (e.g., pixel intensities of the occluding display 174) based on the color information 136, brightness information 138, and/ or environmental brightness information 140 such that the displayed virtual object 135 has sufficient contrast for the viewer.

In one example, assume the first display signal 182 comprises object information defining two virtual objects 135: a first, light-colored object and a second, dark-colored object (wherein "light-colored" and "dark-colored" are relative to each other). Assume further that the first object is not particularly susceptible to bleed-through from the current background (environmental) light, but that the second object exhibits significant bleed-through of the background light, effectively washing out the second object in the field of view. The display module 155 controls the second display signal 184 to cause the occluding display 174 to depict the second object within the occluding images 158. The second object depicted in the occluding images 158 operates to partly occlude environmental light from reaching the viewer in the region corresponding to the second object in the display images 156. As a result, the second object has heightened contrast and/or is darkened in the field of view.

Because the second object is depicted in a different focal plane in the occluding images 158 than in the displayed images 156, the second object may have different sizing and/or positioning as depicted within the occluding images 158 than in the displayed images 156 to mitigate effects of parallax. As a result, the different depictions of the second object in the displayed images 156 and occluding images 158 appear aligned at the optical reference point within the field of view. Furthermore, the second object may be depicted as out-of-focus in the occluding images 158, which tends to ensure that any display artifacts occurring within the occluding images 158 are not as apparent and/or distracting to the viewer.

Continuing the example, the second display signal 184 causes other portions of the occluding images 158 to be transmissive of the environmental light, which can include non-object portions (i.e., portions not corresponding to determined virtual objects 135) and/or portions corresponding to the determined first object. In another example, the second display signal 184 causes both the first and second objects to be depicted in the occluding images 158, but with different amounts or levels of occlusion for the different objects. For example, the second display signal 184 can cause the first and second objects to be displayed by the occluding display 174 with different pixel intensities (e.g., grayscale level), so that the second object has a greater amount of occlusion than the first object.

The memory 115 may store one or more viewer parameters 150 used to control the positioning of displayed virtual objects 135 on the imagery display 172 and/or the occluding display 174. Generally, the orientation of the viewer's eyes to the virtual objects 135 depicted on the imagery display 172 and occluding display 174 can affect the viewer's interactive experience in a number of different ways, e.g., while wearing an associated body-worn device. For instance, a viewer may experience discomfort when wearing an augmented reality (AR) headset if the headset is not properly calibrated for the viewer. As an example, the headset may fit the viewer properly, but the viewer's eyes may not properly align to the depicted virtual objects 135 due to the viewer having a greater or lesser inter-pupillary distance 152 (i.e., the distance between the viewer's eyes), relative to the body-worn device's default configuration. Such misalignment may also affect the alignment of the depicted virtual objects 135, relative to physical objects within the physical environment. That is, the display module 155 may render virtual objects 135 at positions based on the viewer's eyes being properly aligned. However, due to the viewer's eyes being misaligned, the virtual objects 135 may appear in different positions, relative to physical objects in the physical environment, when viewed by the viewer. Misalignment can also cause parallax errors and other aberrations (e.g., barrel distortion, pincushion distortion, etc.) of the virtual objects 135 when viewed by the viewer. This in turn can affect the viewer's enjoyment of the augmented reality headset, as virtual objects 135 may appear to the user as located in unrealistic positions (e.g., within physical objects, standing off of physical surfaces, etc.) and as having unrealistic shapes. In some embodiments, the inter-pupillary distance 152 for a particular viewer may be determined based on a calibration component executing on the computing device 105, which provides an interface through which the viewer can adjust the positioning of reference markers displayed using the imagery display 172.

The viewer parameters 150 further includes one or more values of horizontal skew 154 reflecting a range of distances from the viewer's eyes at which the displayed virtual objects 135 feel comfortable to the viewer. The values of horizontal skew 154 may further be based on the configuration of the body-worn device, e.g., the focal planes that are produced by the particular arrangement of imagery display 172 and/or occluding display 174. For example, when a computed depth of a virtual object 135 differs substantially from the optical depth of the focal plane (either much closer or much further), the viewer may experience eye strain. The eye strain does not arise from issues of image fusion, but a difference between where the viewer's eye wants to focus and where the eye muscles converge.

The audio output devices 175 may include conventional audio speakers having any suitable form factor (e.g., stand-alone, integrated in a stereo, headphones, etc.), as well as devices using alternative methods of producing sound perceptible by a user, such as bone conduction transducers in a body-worn device. In some embodiments, the audio output devices 175 are included within the computing device 105 (e.g., speakers of the smartphone, tablet device, etc.). In other embodiments, the audio output devices 175 are separate from the computing device 105. The computing device 105 communicates audio signals 185 to the audio output device 175 that are consistent with the interactive experience.

In some embodiments, the computing device 105 is configured to operate in an augmented reality (AR) mode, generally configured to superimpose virtual images such as characters, objects, and/or dynamic visual effects into the field of view using display devices 170. The field of view can be determined using sensor devices 165 such as the visual sensors 166. In some embodiments, the computing device 105 is configured to operate in a virtual reality (VR) mode, generally replacing a viewer's natural field of view of the environment with virtual imagery using the display devices 170.

For example, the display devices 170 could superimpose a virtual character to appear seated on a physical chair within the environment detected using image information acquired by the visual sensors 166. The display of the virtual character on the display device 170 is dynamically adjusted based on the viewer's field of view (orientation), the determined depth of the chair from the viewer, and so forth.

In some embodiments, the computing device 105 is configured to dynamically select one of the AR mode and VR mode based on the sensed characteristics of the environment and/or based on the story generated by the storytelling module. The selection of the AR or VR modes is represented as AR/VR mode 145 and included in memory 115. For example, if the environmental brightness information 140 indicates that the environment is extremely bright (e.g., when the user is in direct sunlight), it may be difficult for a viewer to view overlaid information using the display devices 170. In another example, a virtual setting of the story generated by the storytelling/gameplay module 120 specifies a night-time setting. In these examples, the VR mode may be enabled in order to substantially isolate the viewer's field of view from the surrounding physical environment and thereby reduce the amount of light received from the environment. In both cases, dynamic selection of the AR/VR mode 145 can improve the immersive nature of the storytelling environment, whether through ensuring the user is able to suitably view the overlaid information or through providing a more realistic setting consistent with the virtual setting of the story.

Switching between AR and VR modes may be accomplished through any suitable techniques. In some embodiments, a body-worn headset includes a light-blocking assembly comprising cross polarizers that are disposed in front of each of the viewer's eyes. When one or both of the cross polarizers are rotated, the light from the physical environment that is transmitted to the viewer's eyes can be selectively reduced, and can substantially isolate the viewer's field of view from the physical environment (e.g., a VR mode). Rotating the cross polarizers may be performed manually (e.g., the viewer turns a knob linked with the cross polarizers), or electronically (e.g., a motor receives control signals from computing device 105 based on the AR/VR mode 145 and rotates the cross polarizers. In other embodiments, the light-blocking assembly includes a partially or fully transmissive "see-through" display, such as an OLED or side-lit or naturally lit LCD. In some embodiments, when the VR mode is selected, the occluding display 174 may be operated to entirely occlude environmental light. The display receives control signals from computing device 105 based on the AR/VR display mode 140 and can selectively darken the display to substantially isolate the viewer's field of view from the physical environment.

The display devices 170 are generally used within system 100 to provide a compact AR/VR display that may be carried or worn by the viewer during the interactive experience. As discussed above, the display devices 170 may include devices that are separate from the display of a mobile computing device (e.g., a smartphone or tablet device). Implementations of the compact AR/VR display that use a smartphone or other mobile computing device offer several advantages. For example, implementations able to adapt the viewer's smartphone provide a reduced manufacturing cost of the compact AR/VR display, as no separate computing hardware or display hardware need be included. A camera included in the smartphone may be used as visual sensor 166 to dynamically provide information regarding the physical environment and the viewer's field of view. Using a smartphone may also provide increased convenience to the viewer, and may provide a relatively large display for viewing.

A number of considerations influence the design of a compact AR/VR display that uses a mobile computing device. Generally, the compact AR/VR display includes an optical arrangement that is configured to transmit some or all of the display of the mobile computing device to the viewer's eyes. Depending on the currently selected mode (AR or VR), the optical arrangement is further configured to transmit some or all of the light from the physical environment to the viewer's eyes. It may be beneficial to design a compact AR/VR display to have a relatively small size and weight. Smaller and lighter body-worn implementations allow for use by younger users or other users with reduced size and/or strength, and are generally less fatiguing during the interactive experience. The positioning of the mobile computing device and/or the optical arrangement can also be selected to reduce a moment on the viewer. For example, in a head-worn compact AR/VR display, including a smartphone in a position closer to the viewer's head provides a smaller moment (e.g., corresponding to strain on the neck or upper body) than an implementation in which the smartphone is positioned further from the viewer's head. A compact (small-sized) implementation also reduces manufacturing costs through reduced material and process requirements. A compact implementation may also be more aesthetically pleasing for viewers, when compared with a large or bulky implementation.

Using a mobile computing device in conjunction with an optical arrangement can provide the viewer a reasonably good field of view, which enhances the immersive nature of the interactive environment. Generally, the size of the viewer's field of view is proportional to size of the elements included in the optical arrangement for a particular distance from the viewer's eyes.

FIG. 2 is a diagram illustrating an augmented reality headset configured to interact with a mobile device, according to embodiments described herein. As shown, the diagram 200 depicts a mobile device 210 and an augmented reality headset 220. The augmented reality headset 220 includes a mobile device adapter 222, a headstrap 226, and a mirrored lens 228. The mobile device adapter 222 defines an opening 224 into which the mobile device 210 is received. Generally, insertion of the mobile device 210 into the opening 224 couples the mobile device 210 with the mobile device adapter 222 and further causes the display 215 (an example of the imagery display 172 of FIG. 1) to be arranged with a suitable orientation relative to optical components (not shown) included in the AR headset 220. The mobile device adapter 222 may include any suitable means for removably coupling with the mobile device 210. The mobile device adapter 222 is configured to hold or retain the mobile device 210 with a desired position and orientation relative to a wearer of the augmented reality headset 220.

The light produced by the display 215 of the mobile device 210 (e.g., corresponding to display images 156 of FIG. 1) is redirected through optical components of the AR headset 220 so that the light can be seen by a wearer of the augmented reality headset 220. For example, the produced light could pass through a beam-splitter and reflect off the mirrored lens 228 and into the viewer's eyes. Thus, virtual objects displayed using the display 215 appear as if present within the physical environment of the viewer. Advantageously, by leveraging the hardware resources of the mobile device 210, the augmented reality headset 220 can be produced and sold at reduced costs, relative to other augmented reality devices containing dedicated computer processors, display devices, and so forth.

Figure 3:
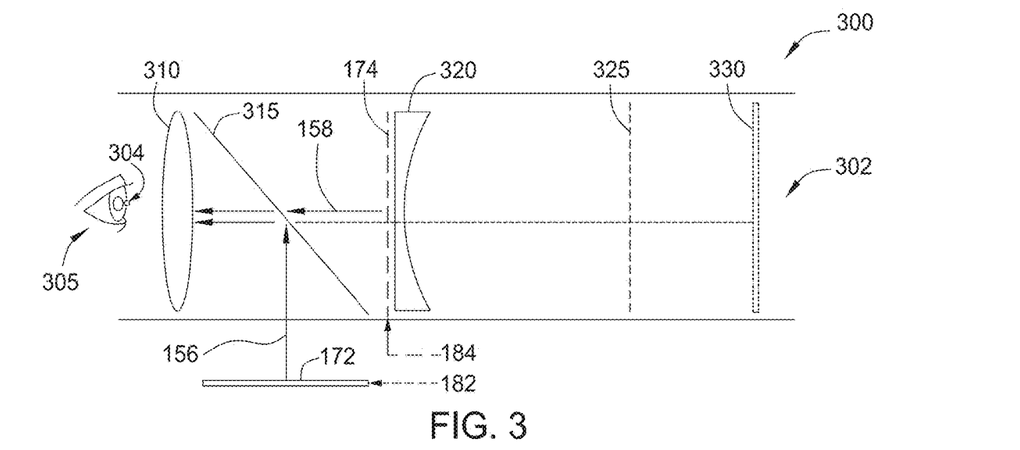
FIGS. 3-5 illustrate exemplary arrangements of an augmented reality (AR) optical system, according to embodiments described herein.
Figure 4:
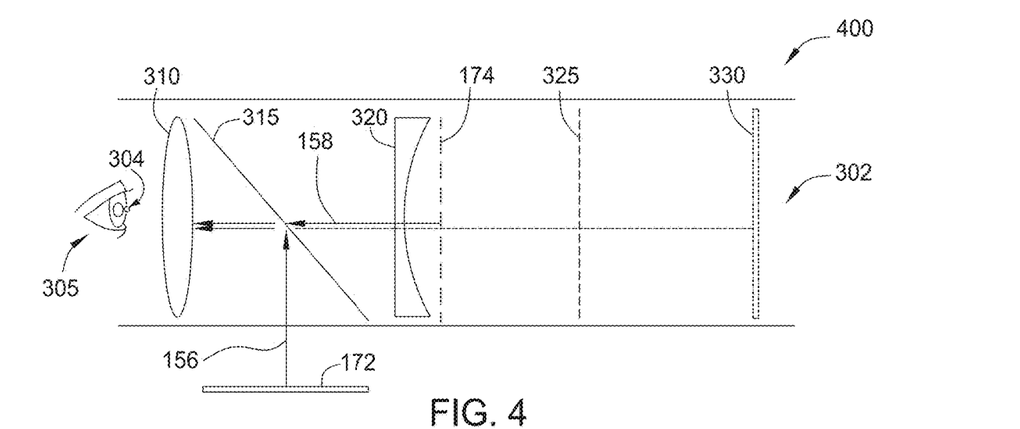
Figure 5:
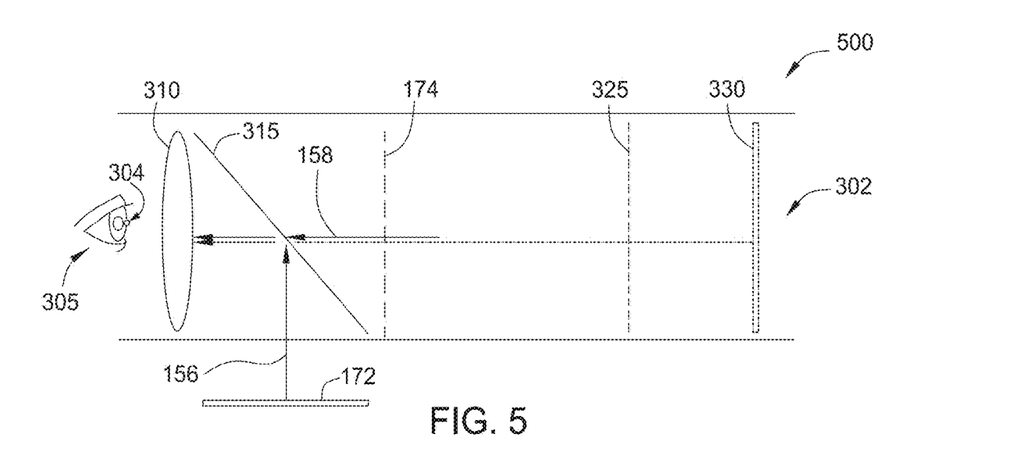

FIGS. 3-5 illustrate exemplary arrangements of an augmented reality (AR) optical system, according to embodiments described herein. Generally, arrangements 300, 400, and 500 represent exemplary arrangements of optical components that may be included in an AR headset 220 (FIG. 2) or other body-worn or carried device. Note that the components of the arrangements 300, 400, 500 and their spacing are not shown to scale. Additionally, for simplicity structural members connecting various components of the arrangements 300, 400, 500 are not depicted.

Arrangement 300 includes an eyepiece 310, a beam-splitter 315, and an objective 320. The arrangement 300 defines a field of view 302 relative to an optical reference point 304. The arrangement 300 further includes imagery display 172 and occluding display 174, which are generally configured to display images that are coupled into the field of view 302, which can be viewed at the optical reference point 304 by a viewer (shown as an eye 305). Although not shown, the arrangement 300 may include a mask that is configured to block light from some of the display area and/or from other portions of the imagery display 172 to prevent these portions from being seen by the viewer. For example, a mask may be provided to prevent edges of a mobile device from being visible to the viewer, which tends to distract the viewer from the immersive nature of the interactive environment.

As shown, the imagery display 172 is arranged facing upward, and the images produced by the imagery display 172 (display images 156 of FIG. 1) are transmitted in the upward direction towards the beam-splitter 315, which is disposed within the field of view 302. The images from the imagery display 172 are focused at a first focal plane 330. In some embodiments, the first focal plane 330 is between about ten (10) inches, which corresponds to a near-focus distance of the viewer's eye 305, and optical infinity. The images are incident upon the beam-splitter 315, which is generally configured to transmit 50% of the incident light and to reflect 50% of the incident light toward the eyepiece 310, thereby coupling the displayed images into the field of view 302. Alternate implementations of the beam-splitter 315 may have different transmissive and reflective percentages. The beam-splitter 315 is further configured to transmit a portion of incident light from the environment toward the eyepiece 310.

In an alternate embodiment in which the imagery display 172 is configured to produce polarized display images, such as an LCD or an OLED display including a polarizer to reduce scatter and glare, the beam-splitter 315 may be polarized to reflect a greater proportion of the polarized display images.

The eyepiece 310 has a positive optical power and may be refractive, reflective, or diffractive. The objective 320 has a negative optical power and may be refractive, reflective, or diffractive. Eyepiece 310 is disposed on a first side of the beam-splitter 315, while objective 320 is disposed on an opposing second side of the beam-splitter 315. In some embodiments, the negative optical power of the objective 320 is complementary to the positive optical power of the eyepiece 310, such that the environment appears in focus for the viewer.

As shown, occluding display 174 is disposed within the field of view 302 between the beam-splitter 315 and the objective 320. The occluding display 174 is configured to display occluding images in a second focal plane 325 nearer to the beam-splitter 315 than the first focal plane 330. The second focal plane 325 is nearer than the first focal plane 330 because the occluding display 174 is further from the focal length of the eyepiece 310 than the imagery display 172. The occluding images operate to reduce environmental light viewed by the viewer for at least a portion of the displayed images, which increases color accuracy and/or improves contrast of the displayed images. Further, although the occluding images appear nearer to the beam-splitter 315 in the second focal plane 325 than the displayed images, this is not perceptible by the viewer as the relatively greater amounts of light from the displayed images tend to override the relatively low light levels of the occluding images.

Arrangement 400 of FIG. 4 illustrates an alternate embodiment in which the occluding display 174 is disposed on an opposite side of the objective 320 from the beam-splitter 315. Arrangement 400 tends to sharpen the occluding imagery for the viewer, but increases the amount of parallax occurring between the displayed images and the occluding images. Arrangement 500 of FIG. 5 illustrates another alternate embodiment without using only the objective 320 to image the occluding image 158. This simple approach tends to reduce the cost, size, and moment of inertia of the arrangement without seriously impacting the viewer's experience. Owing to the high focal length of the optical system produced by the small diameter of a viewer's pupil, the focus of the occluding image 158, although imperfect, is adequate because the human brain tends to "sharpen" blurry images that are aligned with much "crisper", well-defined images.

Note that although the arrangements 300, 400, 500 of FIGS. 3-5 are shown relative to a single eye 305 of the viewer, implementations can include independent optics for both eyes of the viewer. In one example, a single beam-splitter 315 may be shared by two independent lens systems (i.e. two independent positive power eyepieces 310) corresponding to the viewer's two eyes.

Figure 6:
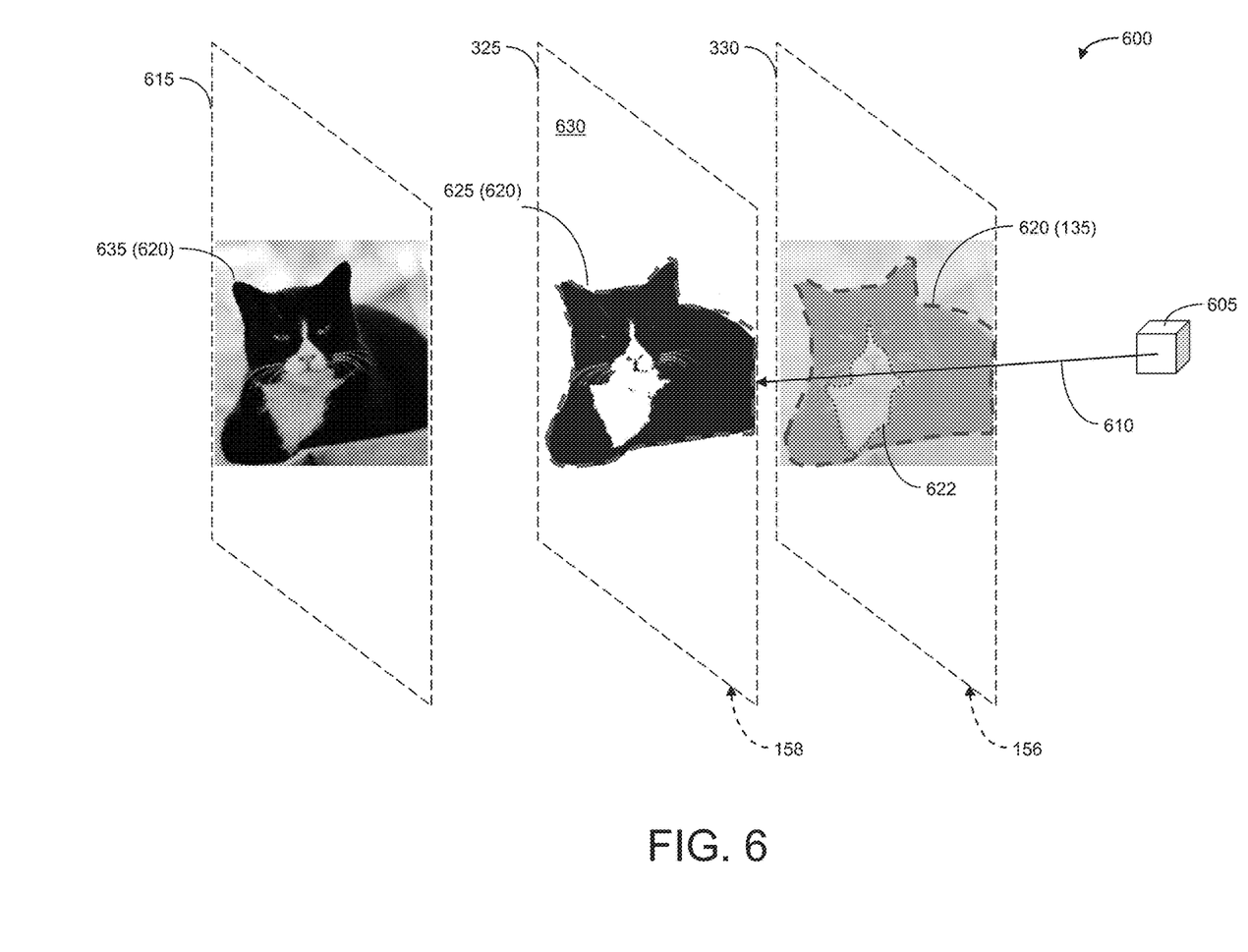
FIG. 6 illustrates the visual effects of combining displayed images with occluding images, according to embodiments described herein.

FIG. 6 illustrates the visual effects of combining displayed images with occluding images, according to embodiments described herein. Specifically, diagram 600 reflects the operation of the various arrangements 300, 400, 500 shown in FIGS. 3-5. Diagram 600 includes the displayed images 156 at a first focal plane 330 and the occluding images 158 at a second focal plane 325. The combination of the displayed images 156 and occluding images 158 produces a composite image 615 to the viewer.

The displayed images 156 depict a cat virtual object 620. Because the virtual object 620 includes a large proportion of black and other dark colors, the virtual object 620 tends to be washed out by environmental light 610, e.g., emitted or reflected by object 605. As shown, a portion 622 of the virtual object 620 is predominantly light colored (e.g., white).

According to various embodiments discussed herein, the occluding images 158 also depict the virtual object 620 within region 625. The region 625 used to depict the virtual object 620 may differ in size and/or positioning from the virtual object 620 as depicted in the displayed images 156, such that a singular virtual imagery 635 of the virtual object 620 is viewed in the composite image 615. For example, the region 625 may be differently positioned within the occluding images 158 in order to compensate for parallax between the displayed images 156 and occluding images 158. Further, in some embodiments the occluding images 158 may depict the virtual object 620 as out of focus within region 625. The region 625 operates to reduce the environmental light 610 that is viewed corresponding to the virtual object 620 of the displayed images 156.

The occluding images 158 may further include a region 630 that is substantially transmissive, allowing environmental light 610 to pass through the region 630 substantially unmitigated. Although not shown, occluding images 158 may include regions that correspond to other virtual objects depicted within the displayed images 156 and that have different levels of occlusion than the region 625 for virtual object 620. In some embodiments, the portion 622 of the virtual object 620 is substantially transmissive.

The displayed images 156 and occluding images 158 may be updated in synchronization so that a singular virtual imagery 635 continues to be perceived by the viewer despite movement of the virtual object 620 within the display images 156.

Figure 7:
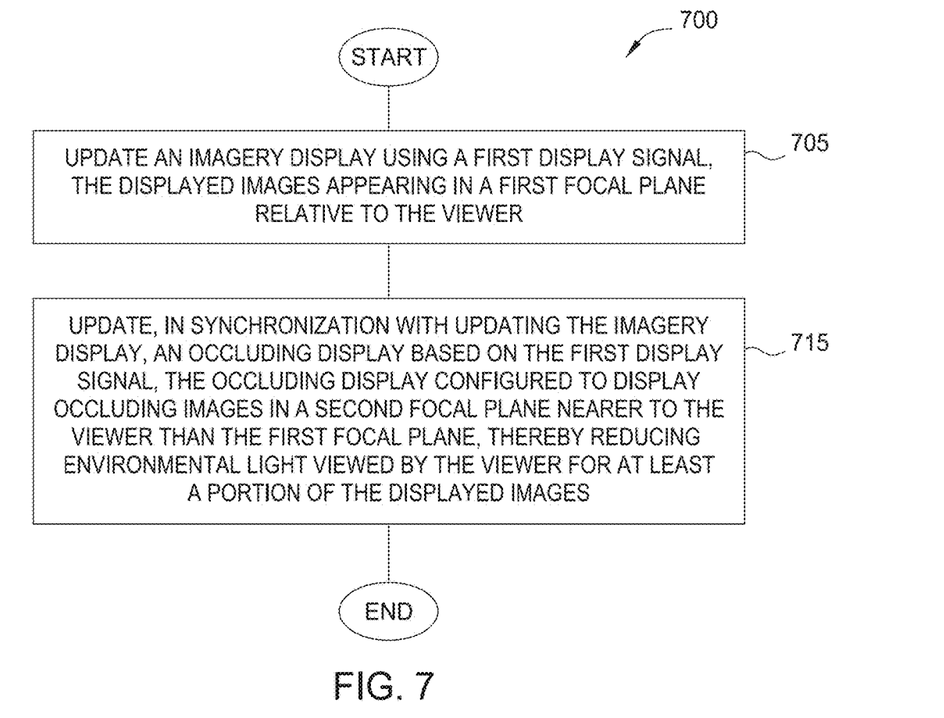
FIG. 7 illustrates a method for operating an augmented reality (AR) optical system, according to embodiments described herein.

FIG. 7 illustrates a method for operating an augmented reality (AR) optical system, according to embodiments described herein. Generally, method 700 is intended to be used in conjunction with any of the arrangements of the augmented reality (AR) optical system discussed herein. While the blocks of method 700 are described as being performed by a display module of a computing device, other implementations are possible.

Method 700 begins at block 705, where the display module updates an imagery display using a first display signal. The displayed images appear in a first focal plane relative to the viewer. In some embodiments, the displayed images are coupled into a field of view of the viewer using a beam-splitter.

At block 715, the display module updates an occluding display in synchronization with updating the imagery display. The occluding display is updated based on the first display signal, and is configured to display occluding images in a second focal plane nearer to the viewer than the first focal plane. Displaying the occluding images operates to reduce the environmental light viewed by the viewer for at least a portion of the displayed images. Method 700 ends following completion of block 715.

Figure 8:
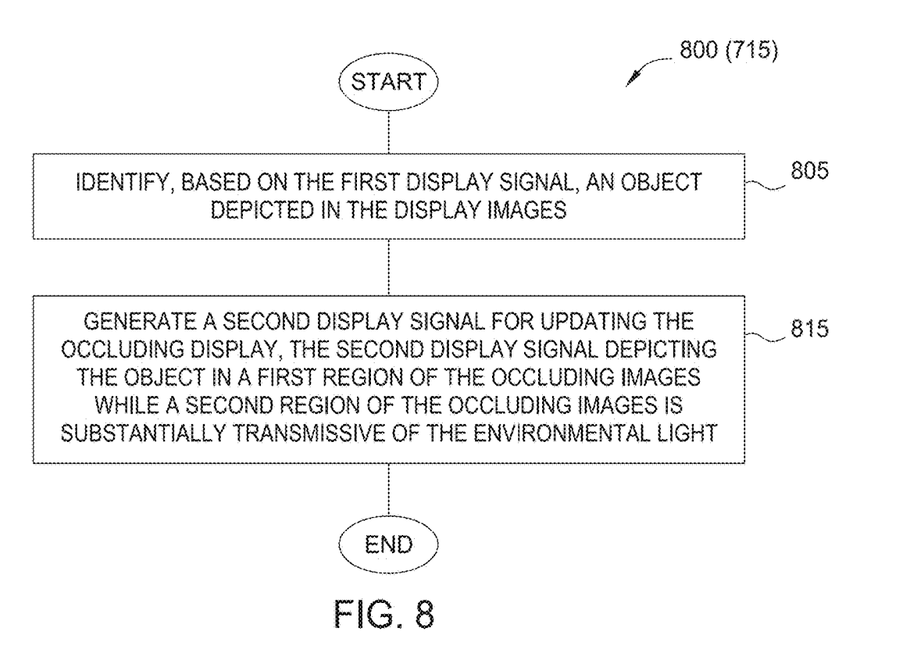
FIG. 8 illustrates a method for updating an occluding display, according to embodiments described herein.

FIG. 8 illustrates a method for updating an occluding display, according to embodiments described herein. Generally, method 800 may be performed as part of block 715 of method 700 discussed above.

Method 800 begins at block 805, where the computing device identifies an object depicted in the display images. In some embodiments, identifying the object is determined through image processing of the display images. The image processing may be performed by an image processing module of the computing device and may include one or more of object detection, determining color information, and determining brightness information.

At block 815, the display module generates a second display signal for updating the occluding display. The second display signal depicts the object in a first region of the occluding images while a second region of the occluding images is substantially transmissive of the environmental light. In some embodiments, generating the second display signal comprises at least one of defocusing the identified object within the occluding images, adjusting a size of the identified object within the occluding images, and adjusting a relative position of the identified object within the occluding images. These may be performed in order to provide a singular virtual imagery to the viewer, e.g., mitigating parallax effects.

In some embodiments, the computing device determines environmental brightness information using a coupled visual sensor, and the display module determines display values of the second display signal (e.g., corresponding to occlusion levels) based on the environmental brightness information. Method 800 ends following completion of block 815.

In the preceding, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., storytelling, gameplay, or other interactive environment applications) or related data available in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. An augmented reality (AR) optical system defining a field of view relative to an optical reference point, the optical system comprising:
an imagery display configured to display images using a received first display signal;
a beam-splitter disposed within the field of view and configured to cause the displayed images to appear in a first focal plane within the field of view; and
an occluding display disposed within the field of view and configured to display, based on the first display signal, occluding images in a second focal plane nearer to the beam-splitter than the first focal plane, thereby reducing environmental light at the optical reference point for at least a portion of the displayed images.

2. The optical system of claim 1, further comprising:
an eyepiece disposed within the field of view on a first side of the beam-splitter and having a postive optical power; and
an objective disposed within the field of view on an opposing, second side of the beam-splitter and having a negative optical power complementary to the positive optical power.

3. The optical system of claim 2, wherein the occluding display is disposed between the beam-splitter and the objective.

4. The optical system of claim 2, wherein the occluding display is disposed on an opposite side of the objective from the beam-splitter.

5. The optical system of claim 1, wherein the occluding display comprises one of a transmissive liquid crystal display (LCD), a transmissive electrowetting display, and a transmissive electronic ink (e-ink) display.

6. The optical system of claim 1, further comprising one or more computer processors configured to:
identify, based on the first display signal, an object depicted in the displayed images; and
generate a second display signal for updating the occluding display, the second display signal depicting the object in a first region of the occluding images while a second region of the occluding images is substantially transmissive of the environmental light.

7. The optical system of claim 6, wherein generating the second display signal for updating the occluding display comprises at least one of: (i) defocusing the identified object within the occluding images, (ii) adjusting a size of the identified object within the occluding images, and (iii) adjusting a relative position of the identified object within the occluding images.

8. A method for operating an augmented reality (AR) optical system for a viewer within an environment, the viewer having a field of view, the method comprising:
updating an imagery display using a first display signal, the imagery display configured to display images that are coupled by a beam-splitter into the field of view, the displayed images appearing in a first focal plane relative to the viewer; and
updating, in synchronization with updating the imagery display, an occluding display based on the first display signal,
the occluding display disposed within the field of view and configured to display occluding images in a second focal plane nearer to the viewer than the first focal plane, thereby reducing environmental light viewed by the viewer for at least a portion of the displayed images.

9. The method of claim 8, wherein updating the occluding display comprises:

identifying, based on the first display signal, an object depicted in the displayed images; and
generating a second display signal for updating the occluding display, the second display signal depicting the object in a first region of the occluding images while a second region of the occluding images is substantially transmissive of the environmental light.

10. The method of claim 9, wherein generating the second display signal for updating the occluding display comprises at least one of: (i) defocusing the identified object within the occluding images, (ii) adjusting a size of the identified object within the occluding images, and (iii) adjusting a relative position of the identified object within the occluding images.

11. The method of claim 9, wherein identifiying an object depicted in the displayed images comprises performing image processing on the displayed images.

12. The method of claim 11, wherein performing image processing on the displayed images comprises at least one of: (i) object detection, (ii) determining color information, and (iii) determining brightness information.

13. The method of claim 8, further comprising:
determining, using a visual sensor, environmental brightness information,
wherein generating the second display signal comprises determining display values of the occluding images based on the determined environmental brightness information.

14. The method of claim 8, wherein the occluding display is updated with the first display signal.

15. A computer program product for operating an augmented reality (AR) optical system defining a field of view relative to an optical reference point, the computer program product comprising:
a computer-readable device having computer-readable program code embodied therewith, the computer-readable program code executable by one or more computer processors to:
update an imagery display using a first display signal, the imagery display configured to display images that are caused by a beam-splitter to appear in a first focal plane within the field of view; and
update, in synchronization with updating the imagery display, an occluding display based on the first display signal,
the occluding display disposed within the field of view and configured to display occluding images in a second focal plane nearer to the beam-splitter than the first focal plane, thereby reducing environmental light at the optical reference point for at least a portion of the displayed images.

16. The computer program product of claim 15, wherein updating the occluding display comprises:
identifying, based on the first display signal, an object depicted in the displayed images; and
generating a second display signal for updating the occluding display, the second display signal depicting the object in a first region of the occluding images while a second region of the occluding images is substantially transmissive of the environmental light.

17. The computer program product of claim 16, wherein generating the second display signal for updating the occluding display comprises at least one of: (i) defocusing the identified object within the occluding images, (ii) adjusting a size of the identified object within the occluding images, and (iii) adjusting a relative position of the identified object within the occluding images.

18. The computer program product of claim 16, wherein identifiying an object depicted in the displayed images comprises performing image processing on the displayed images.

19. The computer program product of claim 18, wherein performing image processing on the display images comprises at least one of: (i) object detection, (ii) determining color information, and (iii) determining brightness information.

20. The computer program product of claim 15, wherein the computer-readable program code is further configured to:
   determine, using a visual sensor, environmental brightness information,
   wherein generating the second display signal comprises determining display values of the occluding images based on the determined environmental brightness information.

* * * * *

UNITED STATES PATENT AND TRADEMARK OFFICE
CERTIFICATE OF CORRECTION

PATENT NO. : 9,922,464 B2  
APPLICATION NO. : 15/150916  
DATED : March 20, 2018  
INVENTOR(S) : Eric C. Haseltine et al.

It is certified that error appears in the above-identified patent and that said Letters Patent is hereby corrected as shown below:

In Column 17, Line 18, in Claim 2, delete "postive" and insert -- positive --, therefor.

In Column 18, Line 14, in Claim 11, delete "identifiying" and insert -- identifying --, therefor.

In Column 19, Line 2, in Claim 18, delete "identifiying" and insert -- identifying --, therefor.

Signed and Sealed this  
Third Day of July, 2018

Andrei Iancu  
*Director of the United States Patent and Trademark Office*